United States Patent
Rabasco et al.

(10) Patent No.: US 7,297,644 B2
(45) Date of Patent: Nov. 20, 2007

(54) NONWOVEN BINDERS WITH HIGH WET/DRY TENSILE STRENGTH RATIO

(75) Inventors: John Joseph Rabasco, Allentown, PA (US); Ronald Joseph Pangrazi, Fleetwood, PA (US); Richard Henry Bott, Macungie, PA (US)

(73) Assignee: Air Products Polymers, L.P., Allentown, PA (US)

( * ) Notice: Subject to any disclaimer, the term of this patent is extended or adjusted under 35 U.S.C. 154(b) by 312 days.

(21) Appl. No.: 10/447,009

(22) Filed: May 28, 2003

(65) Prior Publication Data

US 2004/0242106 A1 Dec. 2, 2004

(51) Int. Cl.
*D04H 1/00* (2006.01)
(52) U.S. Cl. ...................... 442/327; 442/333
(58) Field of Classification Search ............... 442/327, 442/333
See application file for complete search history.

(56) References Cited

U.S. PATENT DOCUMENTS

| | | | |
|---|---|---|---|
| 3,081,197 A | 3/1963 | Adelman ................ | 117/140 |
| 3,137,589 A | 6/1964 | Reinhard et al. ........ | 117/140 |
| 3,380,851 A | 4/1968 | Lindemann et al. ..... | 117/140 |
| 4,332,850 A | 6/1982 | Iacoviello | |
| 4,449,978 A | 5/1984 | Iacoviello | |
| 4,481,250 A | 11/1984 | Cook et al. | |
| 4,659,595 A | 4/1987 | Walker et al. | |
| 4,702,957 A * | 10/1987 | Mudge ................ | 442/327 |
| 5,540,987 A | 7/1996 | Mudge et al. | |
| 6,174,568 B1 | 1/2001 | Lumpp et al. | |
| 2003/0073777 A1 * | 4/2003 | Eknoian et al. .......... | 524/502 |

FOREIGN PATENT DOCUMENTS

| | | |
|---|---|---|
| EP | 0 259 643 | 3/1988 |
| EP | 0 302 521 | 2/1989 |
| EP | 0 612 718 | 8/1994 |
| WO | WO 02/079270 | 10/2002 |
| WO | WO 03/048441 | 6/2003 |

* cited by examiner

*Primary Examiner*—Peter D. Mulcahy
(74) *Attorney, Agent, or Firm*—Mary E. Bongiorno; Russell L. Brewer

(57) ABSTRACT

This invention is directed to an improved nonwoven product comprising a nonwoven web of fibers bonded together with a sufficient amount of binder comprised of a polymer comprised of vinyl acetate, ethylene, and a crosslinking monomer to form a self-sustaining web. The improvement in the nonwoven product resides in the use of a polymer having a crystalline melting point ($T_m$) ranging from 35 to 90° C., preferably 50 to 80° C.; measured at a heat rate of 20° C./minute. The polymer should have a crystalline heat of fusion ($H_f$), which typically range from about 2 to about 50 joules per gram and a low glass transition temperature ($T_g$), e.g., from 10 to −40° C., typically −15 to −35° C.

20 Claims, No Drawings

NONWOVEN BINDERS WITH HIGH WET/DRY TENSILE STRENGTH RATIO

BACKGROUND OF THE INVENTION

Nonwoven webs find application in a number of end uses, including paper towels, disposable diapers, filtration products, disposable wipes, and the like. Nonwoven products of fabrics, comprise loosely assembled webs or masses of fibers bound together with an adhesive binder. It is known to form bonded nonwoven fabrics by impregnating, printing or otherwise depositing an adhesive bonding composition on a base web predominantly comprising relatively long fibers, including those of textile length of from about ½ inch (1.27 cm) to about 2½ inches (6.35 cm), or more. These fibers may be of cellulosic or polymeric materials such as polyesters, polyamides, polyacrylates, and the like. The base web of nonwoven fibers, to which the binder is applied, can be produced by carding, garnetting, airlaying, papermaking procedures, or other known operations. The operation of bonding fibers in place is much less expensive than conventional spinning and weaving. In comparison with woven fabrics, the bonded nonwoven fabrics can be made in a much greater range of thicknesses per unit weight, with more homogeneous structures, no unraveling tendency, and with greater water absorbency, porosity and resiliency, when required.

There are many factors that lead to acceptable nonwoven products. Two major factors are the wet tensile strength and "feel" of the nonwoven product. Personal care products such as tissues, handwipes and sanitary napkins must have sufficient wet tensile strength to remain intact when wet and sufficient softness or feel when in contact with the skin. However, to achieve desirable or sufficient wet tensile strength it has been common practice to elevate the dry tensile strength of the polymer or use higher add-on levels of polymer. Higher dry tensile strengths in a nonwoven product tends to impart stiffness or a hardness to the product and uncomfortable to the touch. Higher add-on levels of polymer are undesirable from a user standpoint in terms of feel and from a cost standpoint.

There has been an industry correlation of the wet tensile strength of a nonwoven product to its dry tensile strength with the dry tensile strength of a nonwoven product generally being secondary to its wet tensile strength. Because of these contrasting properties, i.e., wet tensile strength vs. dry tensile strength and feel, a product that has a high wet/dry tensile strength ratio is desired. Also, a high ratio of wet tensile strength to dry tensile strength generally permits a lower add-on level of polymer to the nonwoven product, thereby improving the feel of the fabric and reducing manufacturing costs Representative of various binder compositions used in the art include:

U.S. Pat. No. 3,081,197 (1963) discloses a nonwoven binder comprising polymers of vinyl acetate, another polymerizable compound as an internal plasticizer, and a postcurable comonomer such as N-methylol acrylamide.

WO 02/079270 A2 (2002) discloses emulsion polymerized ethylene-vinyl acetate polymers having greater than 55 percent by weight ethylene and a hydrophilic colloid stabilizer. Examples of hydrophilic polymer colloids are based upon at least two copolymerized monomers with one having acidic functionality, e.g., a carboxylic acid or dicarboxylic acid, a sulfonic acid, or phosphonic group. They are characterized as having excellent peel and shear properties with excellent tack. These copolymers are characterized as water-dispersible in an aqueous solution but non dispersible in a solution containing 0.5 with percent of an inorganic salt. Functionalized copolymers formed at 1100 psi ethylene pressure also are disclosed which are suited for nonwoven applications. N-methylol acrylamide, acrylamide, hydroxyethyl acrylate and ammonium acrylamidylpropyl sulfonate are disclosed as the monomers providing functional groups.

U.S. Pat. No. 3,137,589 (1964) discloses binders comprising a copolymer of an alpha, beta-unsaturated carboxylic acid amide substituted on the nitrogen by at least one methylol group and another unsaturated polymerizable compound.

U.S. Pat. No. 3,380,851 (1968) discloses a binder comprising an interpolymer of vinyl acetate-ethylene-N-methylol acrylamide. The ethylene content is from 5 to 40% by weight.

U.S. Pat. No. 4,449,978 (1984) discloses a process for forming vinyl acetate-ethylene nonwoven binders having reduced formaldehyde emitting content. The crosslinking agent is a mixture of N-methylolacrylamide and acrylamide.

U.S. Pat. No. 5,540,987 (1996) discloses the formation of formaldehyde free and formaldehyde reduced vinyl acetate/ethylene binders for nonwoven products. These binders are formed by emulsion polymerization using an initiator system based upon an organic peroxide and ascorbic acid. The crosslinking agent can be N-methylolacrylamide for nonwovens of reduced formaldehyde and iso-butoxy methyl acrylamide for formaldehyde free nonwovens.

BRIEF SUMMARY OF THE INVENTION

This invention is directed to an improved nonwoven product comprising a nonwoven web of fibers bonded together with a sufficient amount of binder comprised of a polymer comprised of vinyl acetate, ethylene, and a crosslinking monomer to form a self-sustaining web. The improvement in the nonwoven product resides in the use of a polymer having a crystalline melting point ($T_m$) ranging from 35 to 90° C., preferably 50 to 80° C.; measured at a heat rate of 20° C./minute.

The polymer preferably should have a crystalline heat of fusion ($H_f$), which typically range from about 2 to about 50 joules per gram (J/g), measured at a heat rate of 20° C./minute and a glass transition temperature ($T_g$), e.g., from about 10 to −40° C., typically from about −15 to −35° C., measured at a heat rate of 20° C./minute.

The nonwoven product in terms of a cellulose substrate comprising the above polymer can be characterized as having a wet/dry tensile strength ratio of 0.7, and preferably greater than 0.75 or even 0.8. This wet/dry tensile strength ratio can be achieved, for example, at N-methylolacrylamide levels of 4 to 6%, and at polymer binder add-on levels of about 20%.

Significant advantages in nonwoven products can be achieved and they include:

an ability to produce nonwoven webs using vinyl acetate-ethylene crosslinking polymers, which have a high wet/dry tensile strength ratio;

an ability to produce nonwoven products having excellent wet tensile strength;

an ability to produce nonwoven webs having an excellent rate of absorption;

an ability to produce nonwoven products having exceptional softness; and, an ability to produce nonwoven webs having the above properties using industry acceptable polymer binder add-on levels.

DETAILED DESCRIPTION OF THE INVENTION

The invention improves upon existing emulsion polymerized vinyl acetate-ethylene-crosslinking emulsion polymer technology by providing vinyl acetate-ethylene nonwoven binders having crystalline ethylene segments that impart a high wet tensile strength and a high wet/dry tensile strength ratio with excellent rates of absorption at reasonable coat weights.

The aqueous based vinyl acetate-ethylene polymer emulsions of this invention are based upon an polymer comprised of polymerized units of vinyl acetate, ethylene and a crosslinking monomer with the level of polymerized units of vinyl acetate ranging from 25 to 85% by weight of the polymer, a level of polymerized units of ethylene ranging from 15% to 75% by weight; preferably from 20 to 45% by weight ethylene, and a level of crosslinking monomer from 1 to 10% by weight, preferably from 3 to 6% by weight, the balance being vinyl acetate.

Crosslinking monomers suited for forming the nonwoven binder include N-methylolacrylamide (NMA), a mixture of NMA and acrylamide, typically in a 50/50 ratio, often referred to as MAMD; acrylamidobutyraldehyde, dimethylacetal diethyl acetal, acrylamidoglycolic acid, methylacrylamidoglycolate methyl ether, isobutylmethylol acrylamide and the like. NMA and MAMD are the crosslinkers of choice and are the ones of commercial choice.

Other comonomers conventionally employed in the emulsion polymerization of polymers for nonwoven goods can used. Typically, from 0 to 10% by weight of polymerized comonomer units are incorporated. Examples of comonomers include $C_{1-8}$ (meth)acrylates, such as butyl and 2-ethylhexyl acrylate, vinyl esters, and $C_{8-12}$ aliphatic esters such as vinyl versatate; carboxylic acids such as (meth)acrylic acid.

It has been found that in the development of vinyl acetate-ethylene polymers for nonwoven applications by emulsion polymerization that the concentration of vinyl acetate and ethylene in the polymer is not solely responsible for its use as a nonwoven adhesive. The distribution of vinyl acetate and ethylene is a major factor in achieving a high wet/dry tensile strength ratio. It has been found that there needs to be a sufficient level of amorphous ethylene polymer segments in the polymer to allow for adhesion to a fibrous substrate and a sufficient level of crystalline ethylene polymer segments to provide the proper balance of wet and dry tensile strength characteristics. The presence of amorphous ethylene is accounted for largely in the $T_g$ of the polymer and the presence of crystalline ethylene segments in the vinyl acetate-ethylene crosslinkable copolymer is accounted for in other parameters of the copolymers, i.e., the thermal melting point ($T_m$), and the heat of fusion ($H_f$).

The $T_g$ of the polymer is influenced by the ethylene content in the polymer, i.e., generally the more ethylene present in the polymer relative to other co-monomers, the lower the $T_g$. However, it has been found that under certain polymerization conditions where formation of crystalline polyethylene domains are favored, the $T_g$ does not continue to systematically decrease in proportion to the increase in ethylene concentration. If the ethylene segments were short, resulting in amorphous, as opposed to crystalline ethylene domains, the $T_g$ would drop even further.

Crystalline polyethylene domains in the polymer impart a thermal melt temperature ($T_m$) and heat of fusion ($H_f$) to the polymer. A polymer having a $T_m$ of at least 35° C. and preferably 50 to 90° C., as measured via differential scanning calorimetry (DSC) at a heat rate of 20° C. per minute, is preferred in use for nonwoven webs. The $H_f$ is indicative of the amount of crystalline ethylene domains in the polymer. The $H_f$ ranges from about 2 to 50 J/g, preferably 5 to 30 J/g as measured via DSC at a heat rate of 20° C. per minute. In crosslinked vinyl acetate-ethylene systems, the heat of fusion values are typically lower than in non-crosslinked vinyl acetate-ethylene systems presumably because of the inherent crosslinking function of the crosslinker. This crosslinking chemistry during the DSC measurements impacts some crystalline domains, thus potentially reducing the observed heat of fusion values.

One way to enhance crystalline ethylene domain formation in the polymer is to delay the addition of vinyl acetate during the polymerization process such that the unreacted vinyl acetate level present in the reactor is minimal at different stages during the process, i.e., below 5% unreacted free vinyl acetate monomer. A uniform delay is one where the vinyl acetate is added over the polymerization. A staged polymerization completes the addition of vinyl acetate within 75% of the total polymerization reaction period and generally within 3 hours or less. The crosslinking monomer is typically added over the course of the polymerization. Thus, vinyl acetate-ethylene-crosslinking monomer polymerization can take place in a stage where most, but not all, of the ethylene will reside in amorphous regions and thereby result in a polymer having a low $T_g$, and the formation of the majority of crystalline ethylene domains can occur in another stage of the polymerization process. A staged polymerization is preferred in the development of vinyl acetate-ethylene polymers having crystalline ethylene segments.

Other factors leading to crystalline ethylene domains within the polymer is the pressure and temperature of polymerization. Although pressure is influential in achieving higher ethylene concentration levels in the polymer, it also is a factor in determining whether the amount of ethylene which is present is in amorphous regions or crystalline domains. Temperature, also is relevant in the formation of ethylene crystallinity.

Lastly, the level of initiator is also a factor in developing copolymers for nonwoven applications. In the preferred process for effecting polymerization and the formation of vinyl acetate-ethylene polymers for nonwoven applications, polymerization of ethylene, vinyl acetate, and crosslinking monomer is initiated by thermal initiators or by redox systems. A thermal initiator is typically used at temperatures of about 60° C. or higher, preferably about 70° C. or higher. Redox systems can be used over a wide range of temperatures, but are typically used at temperatures of about 60° C. or lower. Thermal initiators are well known in the emulsion polymer art and include, for example, ammonium persulfate, sodium persulfate, and the like. Suitable redox systems are based upon sulfoxylates, and peroxides. Sodium formaldehyde sulfoxylate or ascorbic acid and hydrogen peroxide or organic peroxides such as t-butyl hydroperoxide (t-BHP) are representative.

The amount of initiator used in the process typically is substantially higher than used in prior processes for forming aqueous based vinyl acetate-ethylene dispersion polymers. Typically, the level of initiator is at least 0.5% and typically greater than 0.8% by weight of the total monomer charged. In addition, it is preferred that the initiator is added over the time of polymerization.

It is believed that a high radical flux created by the higher levels of initiator facilitates ethylene incorporation during this low pressure polymerization process and leads to crystalline ethylene segments and a branched polymer architecture in the resulting copolymer and thus exhibits a higher tensile storage modulus at elevated temperatures, a thermal melting point, and a heat of fusion.

The ethylene and, optionally, other monomers, then are introduced under a pressure of less than about 2000 psig (13,891 kPa). This is performed under agitation while the temperature is increased to reaction temperature. Initiator, vinyl acetate, ethylene, crosslinking monomer, and emulsifier are staged or added incrementally over the reaction period, and the reaction mixture maintained at reaction temperature for a time required to produce the desired product. Preferred pressures leading to production of a low $T_g$ polymer in one polymerization stage and ethylene crystallization in another polymerization stage range from about 500 psig (3548 kPa) to 1800 psig (12,512 kPa).

The formation of vinyl acetate-ethylene polymers suited for nonwoven applications is highly influenced by the stabilizer system. First, the stabilizing system must support formation of emulsions having a solids content of at least 40% by weight, generally 50% and higher. Second, the stabilizing systems should be one that does not interrupt ethylene domains leading to crystalline polyethylene segments within the polymer.

A protective colloid such as polyvinyl alcohol or cellulosic colloid may be employed as a component of one of the suitable stabilizing system described herein. An example of a preferred cellulosic protective colloid is hydroxyethyl cellulose. The protective colloid can be used in amounts of about 0.1 to 10 wt %, preferably 0.5 to 5 wt %, based on the total monomers. The use of polyvinyl alcohol is acceptable but not preferred when NMA is used as a crosslinker.

The surfactant or emulsifier can be used at a level of about 1 to 10 wt %, preferably 1.5 to 6 wt %, based on the total weight of monomers and can include any of the known and conventional surfactants and emulsifying agents, principally the nonionic, anionic, and cationic materials, heretofore employed in emulsion polymerization. Among the anionic surfactants found to provide good results are alkyl sulfates and ether sulfates, such as sodium lauryl sulfate, sodium octyl sulfate, sodium tridecyl sulfate, and sodium isodecyl sulfate, sulfonates, such as dodecylbenzene sulfonate, alpha olefin sulfonates and sulfosuccinates, and phosphate esters, such as the various linear alcohol phosphate esters, branched alcohol phosphate esters, and alkylphenolphosphate esters.

Examples of suitable nonionic surfactants include the Igepal surfactants which are members of a series of alkylphenoxy-poly(ethyleneoxy)ethanols having alkyl groups containing from about 7 to 18 carbon atoms, and having from about 4 to 100 ethyleneoxy units, such as the octylphenoxy poly(ethyleneoxy)ethanols, nonylphenoxy poly(ethyleneoxy)ethanols, and dodecylphenoxy poly(ethyleneoxy) ethanols. Others include fatty acid amides, fatty acid esters, glycerol esters, and their ethoxylates, ethylene oxide/propylene oxide block polymers, secondary alcohol ethoxylates, and tridecylalcohol ethoxylates.

Examples of common cationic surfactants are dialkyl quaternaries, benzyl quaternaries, and their ethoxylates.

Average particle size distributions for the polymer particles of the emulsion polymers of this invention range from 0.05 microns to 2 microns, preferably 0.10 microns to 1 micron.

In the formation of nonwoven products, the starting layer or mass can be formed by any one of the conventional techniques for depositing or arranging fibers in a web or layer. These techniques include carding, garnetting, air-laying, and the like. Individual webs or thin layers formed by one or more of these techniques can also be laminated to provide a thicker layer for conversion into a fabric. Typically, the fibers extend in a plurality of diverse directions in general alignment with the major plane of the fabric, overlapping, intersecting, and supporting one another to form an open, porous structure. When reference is made to "cellulose" fibers, those fibers containing predominantly $C_6H_{10}O_5$ groupings are meant. Thus, examples of the fibers to be used in the starting layer are the natural cellulose fibers such as wood pulp, cotton, and hemp and the synthetic cellulose fibers such as rayon, and regenerated cellulose. Often the fibrous starting layer contains at least 50% cellulose fibers, whether they are natural or synthetic, or a combination thereof. Often the fibers in the starting layer may comprise natural fibers such as wool, or jute; artificial fibers such as cellulose acetate; synthetic fibers such as polyamides, nylon, polyesters, acrylics, polyolefins, i.e., polyethylene, polyvinyl chloride, polyurethane, and the like, alone or in combination with one another. The fibrous starting layer is subjected to at least one of the several types of bonding operations to anchor the individual fibers together to form a self-sustaining web. Some of the better known methods of bonding are overall impregnation, or printing the web with intermittent or continuous straight or wavy lines or areas of binder extending generally transversely or diagonally across the web and additionally, if desired, along the web.

The amount of binder, calculated on a dry basis, applied to the fibrous starting web should be at least about 3 wt % and suitably ranges from about 10 to about 100% or more by weight of the starting web, preferably from about 10 to about 30% by weight of the starting web. The impregnated web is then dried and cured. Thus, the fabrics are suitably dried by passing them through an air oven or the like and then through a curing oven. Typical conditions to achieve optimal crosslinking are sufficient time and temperature such as drying at 150° F. to 200° F. (66° C. to 93° C.) for 4 to 6 minutes, followed by curing at 300° F. to 310° F. (149° C. to 154° C.) for 3 to 5 minutes or more. However, other time-temperature relationships can be employed as is well known in the art, shorter times at higher temperatures or longer times at lower temperatures being used.

The invention is further clarified by a consideration of the following examples, which are intended to be purely exemplary of the invention. Ethylene levels in the polymer were determined by mass balance. The designation U represents delay and S represents staged, i.e. the vinyl acetate is added within 75% of the total polymerization reaction period.

GRIT

Grit measurements were obtained by filtering a weighed quantity of emulsion polymer through a 100-mesh screen. The filtrate from this screen was then filtered through a 325-mesh screen. The weight of the dried polymer collected on each screen was divided by the total emulsion polymer weight resulting in a grit value for each mesh size.

MEASUREMENT OF $T_g$, $T_m$, AND $H_f$ $T_g$, $T_m$, and $H_f$ were determined via differential scanning calorimetry (DSC) using a TA Instruments Thermal Analyst 3100 with DSC 2010 module. Polymer samples were thoroughly dried prior to testing. Samples were held at 100° C. in the calorimeter for 5 minutes, cooled to −75° C., and then the scan acquired at a heating rate of 20° C. per minute up to a final temperature of 200° C. The $T_g$ corresponds to the extrapolated onset values obtained from the baseline shift at the glass transition during the heating scan. The melting point temperature corresponds to the peak in the heat flow curve. The heat of fusion was calculated by integrating the area under the melting endotherm; the baseline for this integration was constructed by extrapolating the linear region of the heat flow curve after the melt, back to the point of intersection with the heat flow curve before the melt.

EXAMPLE 1

A one-gallon stainless steel pressure reactor was charged with the following mixture:

| Material | Mass charged, g |
|---|---|
| DI Water | 1100 |
| Aerosol MA-80I | 10 |
| Vinyl Acetate | 120 |

Aerosol MA-80I supplied by Cytec is the dihexyl ester of sodium sulfosuccinic acid The following delay mixtures were utilized:

| Material | Mass charged, g |
|---|---|
| Aqueous 10.0% ammonium persulfate containing 4.0% sodium bicarbonate | 127 |
| Aqueous 15.0% diluted solution of Rhodacal DS-10 | 260 |
| Vinyl Acetate | 540 |
| NMA (48%) | 140 |
| Ethylene | 1400 psig (9754 kPa) for 5.5 hours |

Rhodacal DS-10, supplied by Rhodia, is sodium dodecylbenzene sulfonate

Agitation at 100 rpm was begun with a nitrogen purge. Agitation was then increased to 900 rpm and the reactor heated to 80° C. After pressurizing the reactor with ethylene to 1400 psig (9754 kPa), 15 g of initiator solution was added at a rate of 5.0 g/min. After the 15 grams of initiator were in the reactor, the initiator delay rate was reduced to 0.30 g/min. At initiation, the vinyl acetate delay was begun at 3.0 g/min, the surfactant delay was begun at 0.72 g/min, and the NMA delay was begun at 0.39 g/min. Ethylene pressure of 1400 psig was maintained for 5.5 hours. The vinyl acetate delay was stopped at the 3 hour mark. The ethylene supply was stopped at the 5.5 hour mark. The surfactant delay, NMA delay, and initiator delay were stopped at the 6 hour mark, followed by holding the reaction mixture at temperature for another 30 minutes. The reaction was then cooled, transferred to a degasser, and 2 g of Rhodaline 675 defoamer was added. The following properties of the resulting emulsion polymer were measured:

| Polymer Composition (by solids calculation) | 45% Ethylene 50% Vinyl acetate 5% NMA |
|---|---|
| $T_g$ Onset (° C.) | −31 |
| Viscosity (60/12 rpm) (cps) | 27/29 |
| 100/325 mesh coagulum (ppm) | 66/51 |
| % solids | 47.5 |
| pH | 5.1 |
| $T_m$ (° C.)/Heat of Fusion (J/g) | 74.6/23.4 |

EXAMPLE 2

The polymer emulsion containing crystalline ethylene segments was prepared by first charging a one-gallon stainless steel pressure reactor with the following mixture:

| Material | Mass charged, g |
|---|---|
| DI Water | 900 |
| Aerosol MA80I | 10 |
| Ferrous ammonium sulfate (2% solution in water) | 6 |
| Vinyl acetate containing 0.57% dodecylmercaptan | 120 |

*Prior to addition of vinyl acetate, the premix pH was adjusted to 4.1 with acetic acid The following delay mixtures were utilized:

| Material | Mass charged, g |
|---|---|
| Aqueous 4.0% t-BHP | 123 |
| Aqueous 8% sodium formaldehyde sulfoxylate | 135 |
| Aqueous solution containing 10 wt % Rhodacal DS-10 and 17.7 wt % NMA | 380 |
| Vinyl acetate containing 0.57% dodecylmercaptan | 540 |
| Ethylene | 1400 psig (9754 kPa) for 5.5 hours |

Agitation at 100 rpm was begun with a nitrogen purge. Agitation was then increased to 900 rpm and the reactor heated to 60° C. and the reactor pressurized to 1400 psig (9754 kPa) with ethylene. Ten grams of sodium formaldehyde sulfoxylate solution was then added. Delay feeds of tert-butylhydrogen peroxide at 0.3 g/min and sodium formaldehyde sulfoxylate at 0.3 g/min were begun. At initiation, the monomer delay was begun at 3.0 g/min and the surfactant/NMA delay was begun at 1.06 g/min. Ethylene pressure of 1400 psig was maintained for 5.5 hours. The monomer delay was stopped at the 3 hour mark. The ethylene valve was closed at the 5.5 hour mark. The surfactant/NMA delay was stopped at the 6 hour mark and the redox delays were stopped 20 minutes thereafter. Next, the reaction was cooled to 35° C. and transferred to a degasser and 2 g of Rhodaline 675 defoamer was added. The following properties of the resulting emulsion polymer were measured:

| Polymer Composition (by solids calculation) | 31.5% Ethylene 62% Vinyl acetate 6.5% NMA |
|---|---|
| $T_g$ Onset (° C.) | −28.6 |
| Viscosity (60/12 rpm) (cps) | 57/78 |
| 100/325 mesh coagulum (ppm) | 83/170 |
| % solids | 44.0 |
| pH | 4.8 |
| $T_m$ (° C.)/Heat of Fusion (J/g) | 71.8/8.2 |

EXAMPLE 3

The polymer emulsion containing crystalline ethylene segments was prepared by first charging a one-gallon stainless steel pressure reactor with the following mixture:

| Material | Mass charged, g |
| --- | --- |
| DI Water | 1000 |
| Aerosol MA80I | 15 |
| Sodium citrate | 1 |
| Vinyl acetate containing 0.89% dodecylmercaptan* | 200 |

*Prior to addition of vinyl acetate, the premix pH was adjusted to 4.5 with citric acid The following delay mixtures were utilized:

| Material | Mass charged, g |
| --- | --- |
| Aqueous 10.0% ammonium persulfate containing 3.5% sodium bicarbonate | 128 |
| 30% Aqueous solution of MAMD Special | 180 |
| Aqueous solution containing 10 wt % Rhodacal DS-10 | 144 |
| Vinyl acetate containing 0.89% dodecylmercaptan | 180 |
| Ethylene | 1500 psig (10,444 kPa) for 5.5 hours |

MAMD Special is a commercial mixture of 50% acrylamide and 50% NMA supplied by Cytec.

Agitation at 100 rpm was begun with a nitrogen purge. Agitation was then increased to 1000 rpm and the reactor heated to 80° C. and the reactor pressurized to 1500 psig (10,444 kPa) with ethylene. 20 g of the ammonium persulfate solution was then added at a rate of 1.0 gram/minute. After the 20 grams of ammonium persulfate solution was in the reactor, the ammonium persulfate solution delay rate was reduced to 0.30 g/min. At initiation, the monomer delay was begun at 0.5 g/min, the MAMD Special delay was begun at 0.5 g/min, and the surfactant delay was begun at 0.4 g/min. Ethylene pressure of 1500 psig was maintained for 5.5 hours. All other delays were run until the 6 hour mark at which time they were stopped. The reaction mixture was then held at temperature for 30 minutes. Next, the reaction was cooled to 40° C. and transferred to a degasser and 2 g of Rhodaline 675 defoamer was added. The following properties of the resulting emulsion polymer were measured:

| Polymer Composition (by solids calculation) | 55% Ethylene 39% Vinyl acetate 6% MAMD |
| --- | --- |
| $T_g$ Onset (° C.) | −33.9 |
| Viscosity (60/12 rpm) (cps) | 25/25 |
| 100/325 mesh coagulum (ppm) | 100/33 |
| % solids | 42 |
| pH | 5.4 |
| $T_m$ (° C.)/Heat of Fusion (J/g) | 68.9/35.9 |

EXAMPLE 4

The polymer emulsion containing crystalline ethylene segments was prepared by first charging a one-gallon stainless steel pressure reactor with the following mixture:

| Material | Mass charged, g |
| --- | --- |
| DI Water | 900 |
| Aerosol MA80I | 15 |
| Sodium Citrate | 1 |
| Ferrous ammonium sulfate (2% solution in water) | 6 |
| Vinyl acetate containing 0.57% dodecylmercaptan* | 250 |

*Prior to addition of vinyl acetate, the premix pH was adjusted to 4.1 with acetic acid The following delay mixtures were utilized:

| Material | Mass charged, g |
| --- | --- |
| Aqueous 4.0% t-BHP | 141 |
| Aqueous 8% sodium formaldehyde sulfoxylate | 152 |
| Aqueous solution containing 8.89 wt % Rhodacal DS-10 and 33.3 wt % MAMD Special | 360 |
| Vinyl acetate containing 0.57% dodecylmercaptan | 405 |
| Ethylene | 1500 psig (10,444 kPa) for 5.5 hours |

Rhodacal DS-10 is sodium dodecyl benzene sulfonate.

Agitation at 100 rpm was begun with a nitrogen purge. Agitation was then increased to 1000 rpm and the reactor heated to 60° C. and the reactor pressurized to 1500 psig with ethylene. 10 g of sodium formaldehyde sulfoxylate solution was then added. Delay feeds of tert-butylhydrogen peroxide at 0.4 g/min and sodium formaldehyde sulfoxylate at 0.4 g/min were begun. At initiation, the monomer delay was begun at 4.5 g/min and the surfactant/NMA delay was begun at 1.2 g/min. Ethylene pressure of 1500 psig (10,444 kPa) was maintained for 4.5 hours. The monomer delay was stopped at the 1.5 hour mark. The ethylene valve was closed at the 4.5 hour mark. The surfactant/NMA delay was stopped at the 5 hour mark and the redox delays were stopped 20 minutes thereafter. Next, the reaction was cooled to 35° C. and transferred to a degasser and 2 g of Rhodaline 675 defoamer was added. The following properties of the resulting emulsion polymer were measured:

| Polymer Composition (by solids calculation) | 29% Ethylene 65% Vinyl acetate 6% MAMD |
| --- | --- |
| $T_g$ Onset (° C.) | −33.0 |
| Viscosity (60/12 rpm) (cps) | 34/38 |
| 100/325 mesh coagulum (ppm) | 81/107 |
| % solids | 42.4 |
| pH | 5.15 |
| $T_m$ (° C.)/Heat of Fusion (J/g) | 68.7/5.6 |

EXAMPLE 5

The polymerization procedure of Example 2 was followed, except sodium erythorbate was used in place of sodium formaldehyde sulfoxylate, and with other minor changes at noted below. The following materials were charged to the reactor:

| Material | Mass charged, g |
|---|---|
| DI Water | 700 |
| Aerosol MA80I | 11.9 |
| Sodium Citrate | 1 |
| Ferrous ammonium sulfate (2% solution in water) | 6 |
| Vinyl acetate containing 0.57% dodecylmercaptan* | 150 |

*Prior to addition of vinyl acetate, the premix pH was adjusted to 4.0 with citric acid The following delay mixtures were utilized:

| Material | Mass charged, g |
|---|---|
| Aqueous 4.0% t-BHP | 209 |
| Aqueous 10% sodium erythorbate | 221 |
| Aqueous solution containing 8.89 wt % Rhodacal DS-10 and 17.1 wt % NMA | 429 |
| Vinyl acetate containing 0.56% dodecylmercaptan | 648 |
| Ethylene | 1400 psig (9754 kPa) for 5.5 hours |

The following properties of the resulting emulsion polymer were measured:

| | |
|---|---|
| Polymer Composition (by solids calculation) | 22% Ethylene 71.5% Vinyl acetate 6.5% NMA |
| $T_g$ Onset (° C.) | −26.6 |
| Viscosity (60/12 rpm) (cps) | 1465/3000 |
| 100/325 mesh coagulum (ppm) | 231/13 |
| % solids | 47.0 |
| pH | 4.72 |
| $T_m$ (° C.)/Heat of Fusion (J/g) | 40/2.3 |

EXAMPLE 6

The polymerization procedure of Example 2 was followed, except the ethylene pressure was set to 1500 psig (10,444 kPa) and minor changes as noted below. The following materials were charged to the reactor:

| Material | Mass charged, g |
|---|---|
| DI Water | 900 |
| Aerosol MA80I | 11 |
| Ferrous ammonium sulfate (2% solution in water) | 6 |
| Vinyl acetate containing 0.57% dodecylmercaptan* | 150 |

*Prior to addition of vinyl acetate, the premix pH was adjusted to 4.5 with acetic acid The following delay mixtures were utilized:

| Material | Mass charged, g |
|---|---|
| Aqueous 4.0% t-BHP | 130 |
| Aqueous 8% sodium formaldehyde sulfoxylate | 140 |
| Aqueous solution containing 7.78 wt % Rhodacal DS-10 and 16 wt % NMA | 380 |

-continued

| Material | Mass charged, g |
|---|---|
| Vinyl acetate containing 0.6% dodecylmercaptan | 540 |
| Ethylene | 1500 psig (10,444 kPa) for 5.5 hours |

The following properties of the resulting emulsion polymer were measured:

| | |
|---|---|
| Polymer Composition (by solids calculation) | 38% Ethylene 57% Vinyl acetate 5% NMA |
| $T_g$ Onset (° C.) | −30.3 |
| Viscosity (60/12 rpm) (cps) | 140/308 |
| 100/325 mesh coagulum (ppm) | 180/120 |
| % solids | 46.4 |
| pH | 5.1 |
| $T_m$ (° C.)/Heat of Fusion (J/g) | 76.9/15.9 |

EXAMPLE 7

The polymerization procedure of Example 2 was followed, except MAMD Special was used instead of NMA and with other minor changes as noted below. The following materials were charged to the reactor:

| Material | Mass charged, g |
|---|---|
| DI Water | 900 |
| Aerosol MA80I | 10 |
| Sodium Citrate | 1 |
| Ferrous ammonium sulfate (2% solution in water) | 6 |
| Vinyl acetate containing 0.57% dodecylmercaptan* | 120 |

*Prior to addition of vinyl acetate, the premix pH was adjusted to 4.1 with citric acid The following delay mixtures were utilized:

| Material | Mass charged, g |
|---|---|
| Aqueous 4.0% t-BHP | 181 |
| Aqueous 10% sodium formaldehyde sulfoxylate | 191 |
| Aqueous solution containing 10 wt % Rhodacal DS-10 and 36.9 wt % MAMD Special | 380 |
| Vinyl acetate containing 0.57% dodecylmercaptan | 540 |
| Ethylene | 1400 psig for 5.5 hours |

The following properties of the resulting emulsion polymer were measured:

| | |
|---|---|
| Polymer Composition (by solids calculation) | 29% Ethylene 64.2% Vinyl acetate 6.8% MAMD |
| $T_g$ Onset (° C.) | −31.5 |
| Viscosity (60/12 rpm) (cps) | 20/20 |
| 100/325 mesh coagulum (ppm) | 401/700 |
| % solids | 41.6 |

-continued

| | |
|---|---|
| PH | 5.25 |
| $T_m$ (° C.)/Heat of Fusion (J/g) | 61.4/4.7 |

EXAMPLE 8

A polymerization procedure similar to Example 1 was followed. A one-gallon stainless steel pressure reactor was charged with the following mixture:

| Material | Mass charged, g |
|---|---|
| DI Water | 1000 |
| Aerosol MA-80I | 10 |
| Sodium citrate | 1 |
| Vinyl Acetate | 120 |

*Prior to addition of vinyl acetate, the premix pH was adjusted to 4.5 with citric acid The following delay mixtures were utilized:

| Material | Mass charged, g |
|---|---|
| Aqueous 10.0% ammonium persulfate containing 3.5% sodium bicarbonate | 138 |
| Aqueous 15.0% diluted solution of Rhodacal DS-10 | 295 |
| Vinyl Acetate | 600 |
| NMA (48%) | 186 |
| Ethylene | 1400 psig (9754 kPa) for 6.5 hours |

Agitation at 100 rpm was begun with a nitrogen purge. Agitation was then increased to 900 rpm and the reactor heated to 80° C. After pressurizing the reactor with ethylene to 1400 psig (9754 kPa), 15 g of initiator solution was added at a rate of 1.0 g/min. After the 15 grams of initiator were in the reactor, the initiator delay rate was reduced to 0.30 g/min. At initiation, the vinyl acetate delay was begun at 3.33 g/min, the surfactant delay was begun at 0.70 g/min, and the NMA delay was begun at 0.78 g/min. Ethylene pressure of 1400 psig (kPa) was maintained for 6.5 hours. The vinyl acetate delay was stopped at the 3 hour mark. The NMA delay was stopped at the 4 hour mark. The ethylene supply was stopped at the 6.5 hour mark. The surfactant delay and initiator delay were stopped at the 7 hour mark, followed by holding the reaction mixture at temperature for another 30 minutes. The reaction was then cooled, transferred to a degasser, and 2 g of Rhodaline 675 defoamer was added. The following properties of the resulting emulsion polymer were measured:

| | |
|---|---|
| Polymer Composition (by solids calculation) | 43% Ethylene<br>50.6% Vinyl acetate<br>6.4% NMA |
| $T_g$ Onset (° C.) | −27 |
| Viscosity (60/12 rpm) (cps) | 1150/2300 |
| 100/325 mesh coagulum (ppm) | 289/126 |
| % solids | 49.9 |
| pH | 4.54 |
| $T_m$ (° C.)/Heat of Fusion (J/g) | 85.3/18.2 |

EXAMPLE 9

The polymer emulsion containing crystalline ethylene segments was prepared by first charging a one-gallon stainless steel pressure reactor with the following mixture:

| Material | Mass charged, g |
|---|---|
| DI Water | 900 |
| Aerosol MA80I | 10 |
| Ferrous ammonium sulfate (2% solution in water) | 6 |
| Vinyl acetate containing 0.57% dodecylmercaptan* | 150 |

*Prior to addition of vinyl acetate, the premix pH was adjusted to 4.0 with citric acid The following delay mixtures were utilized:

| Material | Mass charged, g |
|---|---|
| Aqueous 4.0% t-BHP | 178 |
| Aqueous 10% sodium erythorbate | 187 |
| Aqueous solution containing 7.5 wt % Rhodacal DS-10 and 13.5 wt % NMA | 380 |
| Vinyl acetate containing 0.57% dodecylmercaptan | 540 |
| Ethylene | 700 psig (4928 kPa) for 3 hours and 1400 psig (9754 kPa) for 2.5 hours |

Agitation at 100 rpm was begun with a nitrogen purge. Agitation was then increased to 1000 rpm and the reactor heated to 60° C. and the reactor pressurized to 700 psig with ethylene. 10 g of sodium formaldehyde sulfoxylate solution was then added. Delay feeds of tert-butylhydrogen peroxide at 0.4 g/min and sodium formaldehyde sulfoxylate at 0.4 g/min were begun. At initiation, the monomer delay was begun at 3.0 g/min and the surfactant/NMA delay was begun at 1.06 g/min. Ethylene pressure of 700 psig (4928 kPa) was maintained for 3 hours. At the 3 hour mark, the monomer delay was stopped and the ethylene pressure was increased to 1400 psig. Ethylene pressure of 1400 psig (9754 kPa) was maintained for 2.5 hours. At the 5.5 hour mark, the ethylene valve was closed. The surfactant/NMA delay was stopped at the 6 hour mark and the redox delays were stopped 30 minutes thereafter. Next, the reaction was cooled to 35° C. and transferred to a degasser and 2 g of Rhodaline 675 defoamer was added. The following properties of the resulting emulsion polymer were measured:

| | |
|---|---|
| Polymer Composition (by solids calculation) | 26% Ethylene<br>69% Vinyl acetate<br>5% NMA |
| $T_g$ Onset (° C.) | −15.7 |
| Viscosity (60/12 rpm) (cps) | 27/28 |
| 100/325 mesh coagulum (ppm) | 251/86 |
| % solids | 40.3 |
| pH | 5.59 |
| $T_m$ (° C.)/Heat of Fusion (J/g) | 85.9/10.4 |

COMPARATIVE EXAMPLES 10-13

In comparative examples 10-12, AIRFLEX® 124 vinyl acetate-ethylene polymer, AIRFLEX 192 vinyl acetate-ethylene polymer, and AIRFLEX EN 1165 vinyl acetate-ethylene polymer, respectively, were used as a nonwoven binder. In comparative example 13, data from Example 13 of WO 02/42342 A2 were used.

EXAMPLE 14

Evaluation of Binders In Nonwoven Web

The binders of Examples 1-9 and Comparative Examples 10-12 were evaluated for tensile performance on nonwoven cellulosic substrates. The process of forming the high performance nonwoven webs comprises applying an aqueous polymeric emulsion to a cellulosic based nonwoven web by either spray application or print application methods, removing excess water; and crosslinking the crosslinkable polymer with an effective amount ammonium chloride catalyst and heating to ensure complete reaction. The bonded substrate is subsequently conditioned, cut into uniform strips and tested on a mechanical tensile tester such as an Instron for both dry and wet tensile properties.

The following procedure was used in the evaluation of the materials described herein. The binder formulation consisted of an emulsion polymer composition described herein, water, 1% (solids on solids) ammonium chloride (NH$_4$Cl) as a catalyst for the self crosslinking reaction, and a small amount of a wetting surfactant. The binder composition was diluted to 10% solids and uniformly sprayed onto an airlaid web of a 85:15 blend of cellulose and low melt bicomponent fibers (basis weight 75 g/m$^2$ as supplied). The targeted add-on weight of binder was 20 wt % +/−2 wt %. The sprayed webs were dried and cured in a Mathis LTE through air oven at 320° F. (160° C.) for 3 minutes.

Test methods similar to industry standards, such as ASTM-D1117 (Mechanical Tensile Testing of Strength of Paper and Paperboard), TAPPI T-494 (dry tensile) and TAPPI T-456 (Wet Tensile Strength Determination Using Finch Cup Apparatus) were used to measure tensile strength.

The specific procedure for measuring wet tensile strength was as follows: The finished (bonded) dried and cured airlaid web was cut into 5 cm wide strips and the strips were looped around the finch cup apparatus that was then filled with the wet tensile fluid (either deionized water or deionized water with a small amount of a wetting agent was added, such as 0.5% (solids on solids) Aerosol-OT, a commercially available dioctyl sodium sulfosuccinate surfactant. TAPPI T-456 procedure was then followed. An Instron Model 1122 mechanical tensile tester was used to measure dry and wet tensile strength. The tensile strength is reported in grams per 5 cm.

Results of the tests are presented in the table. Examples 1-9 in the table show that nonwoven product having a high wet tensile strength to dry tensile strength ratio of at least 0.7 and generally at least above 0.75 to 0.8 while maintaining (a) equivalent rates of absorption and pick up levels to commercial vinyl acetate, ethylene, N-methylol crosslinked polymers, (b) excellent wet and dry tensile strength values, and (c) enhanced softness and feel. The polymers are characterized as nontacky or nonsticky in either the non-crosslinked and crosslinked state. Exceptional wet tensile strengths are noted at ethylene levels from 20 to 45% by weight using a redox initiator and anionic surfactants (see Examples 2, 4, 5, and 6).

Example 3 and Comparative Example 13 are relevant in that the levels of ethylene in the polymers are relatively close, e.g., 55 vs. 60%, yet the Example 13 polymer is reported as being tacky in the non-crosslinked state. Further, the wet tensile strength to dry tensile strength ratios of the nonwoven webs are significantly different.

A surprising feature of the polymers in Examples 1-9 is the low and similar $T_g$ levels relative to the commercial vinyl acetate polymers for nonwoven products at equivalent ethylene levels (refer to Example 4 vs. Comparative Example 10 and Example 5 vs. Comparative Example 12). The ethylene levels are about 30% in Example 4 and Comparative Example 10 and 20% in Example 5 and Comparative Example 12 yet the $T_g$'s of the polymers of Examples 4 and 5 are much lower and differ by about 20° C. Further, the polymers of Examples 1-9 have a high thermal melt temperature, i.e., above 40° C. and, generally above 60° C. Although not intending to be bound by theory, the staged polymerization employed in Examples 4 and 5, introduces ethylene at high pressure, e.g., 1400 psig (9754 kPa) and forces copolymerization with the vinyl acetate in one stage resulting in the formation of an extremely low $T_g$ polymer, e.g., −25° C. and below, and then, forces the formation of ethylene crystalline segments in the vinyl acetate starved stage thereby resulting in a thermal melting point and heat of fusion. In the commercial polymers for nonwoven products, polymerization is conducted at much lower pressures, e.g., less than 400 (2859 kPa) to 700 (4928 kPa) psig, and with process conditions favoring a more uniform distribution of ethylene throughout the polymer. These commercial polymers are entirely amorphous and there are no or virtually no crystalline ethylene segments, and thus, there is no thermal melt temperature or heat of fusion.

The effect of an initial low pressure polymerization followed by high pressure polymerization is shown in Example 9. At an ethylene concentration similar to Examples 4 and 5, its $T_g$ is significantly higher. In the final stage of reduced vinyl acetate levels, ethylene crystalline segments are formed leading to a higher $T_m$ and $H_f$.

| Example | % Ethylene | % NMA | % MAMD | Initiation | Pressure psig (kPa) | Addition | $T_g$ | $T_m$ | $H_f$ | Wet tensile strength | Wet/dry ratio | Absorbency Rate (g/g/s) | Nonwoven Feel |
|---|---|---|---|---|---|---|---|---|---|---|---|---|---|
| 1 | 45 | 5 | 0 | T | 1400 (9754) | S | −31 | 75 | 23 | 1530 | 0.97 | 0.71 | Silky, soft |
| 2 | 31.5 | 6.5 | 0 | R | 1400 (9754) | S | −28.6 | 72 | 8 | 2395 | 0.87 | 0.62 | Silky, soft |
| 3 | 55 | 0 | 6 | T | 1500 (10,444) | U | −33.9 | 69 | 36 | 1410 | 0.99 | 0.57 | Silky, soft |
| 4 | 29 | 0 | 6 | R | 1500 (10,444) | S | −33 | 69 | 6 | 1933 | 0.81 | 0.61 | Silky, soft |
| 5 | 22 | 6.5 | 0 | R | 1400 (9754) | S | −26.6 | 40 | 2 | 2002 | 0.75 | 0.66 | Silky, soft |
| 6 | 38 | 5 | 0 | R | 1500 (10,444) | S | −30.3 | 77 | 16 | 2064 | 0.72 | 0.69 | Silky, soft |
| 7 | 29 | 0 | 6.8 | R | 1400 (9754) | S | −31.5 | 61 | 5 | 1919 | 0.91 | 0.67 | Silky, soft |
| 8 | 43 | 6.4 | 0 | T | 1400 (9754) | S | −27 | 85 | 18.2 | 1713 | 0.86 | 0.67 | Silky, soft |

-continued

| Example | % Ethylene | % NMA | % MAMD | Initiation | Pressure psig (kPa) | Addition | $T_g$ | $T_m$ | $H_f$ | Wet tensile strength | Wet/dry ratio | Absorbency Rate (g/g/s) | Nonwoven Feel |
|---|---|---|---|---|---|---|---|---|---|---|---|---|---|
| 9 | 26 | 5 | 0 | R | 700/1400 (4928/9754) | S | −15.7 | 86 | 10 | 1707 | 0.74 | 0.61 | Silky, soft |
| Comp 10 | 30 | 0 | 4.8 | R | <650 (4583) | U | −15 | None | 0 | 1447 | 0.65 | 0.67 | soft |
| Comp 11 | 12 | 0 | 5 | R | <450 (3204) | U | 10 | None | 0 | 1702 | 0.58 | 0.68 | firm |
| Comp 12 | 20 | 5 | 0 | R | <700 (4928) | U | 0 | None | 0 | 1840 | 0.65 | 0.69 | medium |
| Comp 13 | 60 | 4 | 0 | R | 1100 (7686) | U | ND | ND | ND | ND | 0.67 calc | ND | ND |

ND = No data;
T = thermal;
R = redox;
S = staged;
U = delay

What is claimed is:

1. In a nonwoven product comprising a nonwoven web of fibers bonded together with a polymer comprised of polymerized units of vinyl acetate, ethylene, and polymerized units of a crosslinking monomer at a binder add-on which is sufficient to bind the fibers together to form a self-sustaining web, the improvement which comprises:

said polymer comprised of an aqueous-based ethylene-vinyl acetate polymer emulsion comprised of polymerized units of crystalline ethylene segments, said polymer prepared by emulsion polymerizing vinyl acetate, ethylene, and said crosslinking monomer in the presence of a stabilizing system, and, further, said polymer having a crystalline melting point ranging from 35 to 90° C. as measured by differential scanning calorimetry at a heat rate of 20° C. per minute.

2. The nonwoven product of claim 1 wherein the polymer is comprised of from 25% to 85% by weight of polymerized units of vinyl acetate, from 15% to 75% by weight of polymerized units of ethylene, and from 1% to 10% of a crosslinking monomer based upon the total weight of the polymer.

3. The nonwoven product of claim 2 wherein the polymer has a heat of fusion ranging from 2 to 50 joules per gram as measured at a heat rate of 20° C. per minute.

4. The nonwoven product of claim 3 wherein the crosslinking monomer is N-methylolacrylamide.

5. The nonwoven product of claim 4 wherein said polymer has a $T_g$ from 10 to −40° C.

6. The nonwoven product of claim 5 wherein said polymer has from about 20% to 45% ethylene based upon the total weight of the polymer.

7. The nonwoven product of claim 6 wherein the polymer has from 3% to 6% crosslinking monomer by weight based upon the total weight of the polymer.

8. The nonwoven product of claim 7 wherein the heat of fusion is from 5 to 30 joules per gram as measured at a heat rate of 20° C. per minute.

9. The nonwoven product of claim 8 wherein the crystalline melting point is from 50 to 90° C. as measured at a heat rate of 20° C. per minute.

10. The nonwoven product of claim 9 wherein the $T_g$ of the polymer is from −15 to −35° C.

11. The nonwoven product of claim 10 wherein said stabilizing system employed in forming said polymer is an anionic surfactant.

12. The nonwoven product of claim 11 wherein said emulsion polymerization is initiated by a redox system comprised of an organic peroxide and a reducing agent selected from the group consisting sodium formaldehyde sulfoxylate and ascorbic acid.

13. The nonwoven product of claim 8 wherein the polymer emulsion is prepared by staged polymerization.

14. In a nonwoven product comprising a nonwoven web of fibers bonded together with a polymer comprised of polymerized units of vinyl acetate, ethylene, and polymerized units of a crosslinking monomer at a binder add-on, which is sufficient to bind the fibers together to form a self-sustaining web, the improvement which comprises;

said polymer comprised of an aqueous-based ethylene-vinyl acetate polymer emulsion comprised of polymerized units of crystalline ethylene segments, said polymer prepared by emulsion polymerizing vinyl acetate, ethylene and said crosslinking monomer in the presence of a stabilizing system, and further, said nonwoven product having a wet tensile strength to dry tensile strength ratio of at least 0.75.

15. The nonwoven product of claim 14 wherein the polymer consists essentially of from 25% to 85% by weight of polymerized units of vinyl acetate, from 15% to 75% by weight of polymerized units of ethylene, from 1% to 10% of a crosslinking monomer based upon the total weight of the polymer.

16. The nonwoven product of claim 15 wherein the nonwoven web is comprised of cellulose fibers.

17. The nonwoven product of claim 16 wherein the crosslinking monomer is N-methylolacrylamide and is present in an amount from 3 to 6% by weight.

18. The nonwoven product of claim 17 wherein said polymer has from about 20% to 45% ethylene.

19. The nonwoven product of claim 18 wherein the heat of fusion is from 5 to 30 joules per gram measured by differential scanning calorimetry at a heat rate of 20° C. per minute.

20. The nonwoven product of claim 18 wherein the $T_g$ of the polymer is from −15 to −35° C. and a crystalline melting point from about 35 to 90° C.

* * * * *